United States Patent
McKenzie (10) Patent No.: US 12,375,541 B2
(45) Date of Patent: *Jul. 29, 2025

(54) SYSTEM AND METHOD FOR SYNCHRONIZING NETWORKED RENDERING DEVICES

(71) Applicant: D&M Holdings, Inc., Kanagawa (JP)

(72) Inventor: Douglas McKenzie, Newtown (AU)

(73) Assignee: D&M HOLDINGS INC., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/535,115

(22) Filed: Dec. 11, 2023

(65) Prior Publication Data

US 2024/0348673 A1    Oct. 17, 2024

Related U.S. Application Data (63) Continuation of application No. 16/965,059, filed as application No. PCT/US2019/015354 on Jan. 28, 2019, now Pat. No. 11,876,847.

(60) Provisional application No. 62/626,217, filed on Feb. 5, 2018.

(51) Int. Cl.
*H04L 65/60* (2022.01)
*H04L 67/1095* (2022.01)
*H04N 21/43* (2011.01)

(52) U.S. Cl.
CPC .......... *H04L 65/60* (2013.01); *H04L 67/1095* (2013.01); *H04N 21/43076* (2020.08)

(58) Field of Classification Search
CPC ............... H04L 65/60; H04L 67/1095; H04N 21/43076; H04N 21/43; H04N 21/4302; H04N 21/4392; H04N 21/43615; H04N 21/43637; G06F 1/12; H04S 7/301; H04R 2420/07; H04R 3/12

See application file for complete search history.

(56) References Cited

U.S. PATENT DOCUMENTS

| | | | |
|---|---|---|---|
| 9,990,937 B1* | 6/2018 | Tu | G10L 21/043 |
| 2012/0087503 A1* | 4/2012 | Watson | H04S 3/008 381/23 |
| 2013/0031217 A1* | 1/2013 | Rajapakse | H04L 65/65 709/219 |
| 2016/0269771 A1* | 9/2016 | Bangma | H04N 21/4126 |

\* cited by examiner

*Primary Examiner* — Tonia L Dollinger
*Assistant Examiner* — Mehulkumar J Shah
(74) *Attorney, Agent, or Firm* — Nieves IP Law Group, LLC; Peter A. Nieves (57) ABSTRACT

A second media rendering device in a network is synchronized with a first media rendering device in the network. At a first time s1, the second media rendering device sends a request for a current audio sample index from the first media rendering device. The first media rendering device receives the request for the current audio sample index from the second media rendering device. The first media rendering device sends a message including a first current audio sample index equal to a value for a first media rendering device internal sample index. At a second time s2 the second media rendering device receives the first current sample index value from the first media rendering device. The second media rendering device determines a transmission latency, and estimates an updated first media rendering device internal sample index value.

17 Claims, 5 Drawing Sheets

SYSTEM AND METHOD FOR SYNCHRONIZING NETWORKED RENDERING DEVICES

CROSS REFERENCE TO RELATED APPLICATIONS

This application is a Continuation of U.S. National Stage patent application Ser. No. 16/965,059, filed Jul. 27, 2020, which claims the benefit of International Application No. PCT/US19/15354, filed Jan. 28, 2019, which claims the benefit of U.S. Patent Application No. 62/626,217, filed Feb. 5, 2018. The contents of these prior applications are incorporated by reference herein in their entirety.

FIELD OF THE INVENTION

The present invention relates to media rendering devices, and more particularly, is related to synchronization of networked rendering devices.

BACKGROUND OF THE INVENTION

Single and multi-room audio systems, which provide the capability to stream music throughout a given space within a home or other structures are in high demand. In addition, it has become commonplace for an individual to have access to one or more devices that render media, such as an mp3 player, a car stereo, a home entertainment system, a portable computer or tablet, a gaming console, and a smart phone, among others. The rendering devices may have access to a communication network and/or the internet, and may be configured to render digital media provided over the communication network and/or the internet, for example, a digital media streaming service.

For example, audio players can be situated in distinct regions of the home or other structure to provide playback in such distinct regions. Each of the audio players can have its own amplifier(s) and one or more speakers, which are typically installed in one place. For instance, one audio player system can be situated in a living room, while another is in a bedroom. Thus, separate regions/zones of the home can have separate audio players to play back from the same or different audio sources. To play back an audio source, the audio source is provided locally at each audio player, such as via the Internet, local network server, attached storage, external analog audio input, a compact disc or a radio broadcast, etc. Thus, each room can provide the same or different audio content by separately controlling the separate audio player systems. In some examples, a single audio player system can include hardwired speakers in multiple rooms so as to create a unified audio environment in otherwise acoustically separated rooms.

When there is more than one player in a zone, the rendering of a media source is to be synchronized across players to avoid unwanted audio artifacts, for example, phase cancellation and/or an unfocussed "smearing" or stuttering of the audio program. Previous systems have relied on an independent and/or central clock source that is distributed among the players in the zone. However, this may add complexity and cost to the system, and use excess network bandwidth. Therefore, there is a need in the industry to address one or more of the abovementioned shortcomings.

SUMMARY OF THE INVENTION

Embodiments of the present invention provide a system and method for synchronizing networked rendering devices. Briefly described, the present invention is directed to synchronizing a second media rendering device in a network with a first media rendering device in the network. At a first time s1, the second media rendering device sends a request for a current audio sample index from the first media rendering device. The first media rendering device receives the request for the current audio sample index from the second media rendering device. The first media rendering device sends a message including a first current audio sample index equal to a value for a first media rendering device internal sample index. At a second time s2 the second media rendering device receives the first current sample index value from the first media rendering device. The second media rendering device determines a transmission latency, and estimates an updated first media rendering device internal sample index value.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principals of the invention.

DETAILED DESCRIPTION

The following definitions are useful for interpreting terms applied to features of the embodiments disclosed herein, and are meant only to define elements within the disclosure.

As used within this disclosure, a "player" refers to an exemplary media rendering device, for example, a powered speaker, preamp, amplifier, receiver, etc. The term player is not intended to convey that the media rendering device is capable, on its own, of rendering a media signal or media source.

As used within this disclosure, "media" refers to audio and/or video content either stored on a storage medium, such as a disk drive or digital disk, or streamed from a media server. Media may refer to analog and/or digitally formatted data. A specific recorded performance is referred to as a media program.

As used within this disclosure, an originating provider of media, either streamed or locally stored, is referred to as a "media source." Examples of a media source include a music and/or video server, an internet radio station, a streaming service, or a cache of media files.

As used within this disclosure, "rendering" refers to playback of a media program by a media player, also referred to herein as a "media rendering device." Examples of media rendering devices include, but are not limited to, a powered speaker, an mp3 player, a tablet computer, a portable stereo, a home entertainment system, a portable video player, a smart phone, a laptop or desktop computer, and a mobile entertainment system. A media rendering device may generally have one or more audio transducers (speakers) used to render the media audio portion.

As used within this disclosure, a "group" or "zone" generally refers to a collection of one or more media rendering devices that are configured to collectively render a single channel or multi-channel media program, for example, a stereo pair, a stereo pair with subwoofer (2.1), a surround system including front, rear, center, and subwoofer speakers (5.1, 7.1, 7.2), among other collections. Each device in the zone may be configured to render one or more channels of the media program.

As used within this disclosure "joining" generally refers to associating a media rendering device with a group or zone. A zone with two members may be referred to herein as a "pair", and "pairing" indicates joining a first media rendering device to a second media rendering device to form the pair. In particular, as used herein joining and/or pairing refers to a logical association via a data network, as distinguished from an electrical connection, for example, via audio/video and/or speaker cables.

As used within this disclosure "local media" or "local source" may refer to music and or media stored on the rendering device or music/media stored on a memory device which is connected to the media rendering device and shared across the network to other media renderers.

As used within this disclosure, "streaming" refers to a process of real-time transmitting of a media program by a source to a media rendering device. The media rendering device may begin rendering the media before the entire program has been transmitted. Streaming is generally transitory, such that the streamed data is not retained by the media rendering device after the data has been rendered. Portions of a received stream may be buffered for rendering, for example, to ensure rendering is uninterrupted during short interruptions of the streamed transmission. In contrast, a downloaded digital multimedia file is generally received in its entirety before it may be rendered. A downloaded digital multimedia file is generally retained in a memory for subsequent rendering, while a streamed file is generally re-streamed for subsequent renderings.

As used within this disclosure, a "zone leader" refers to a first media rendering device configured for a group or zone. The zone leader may serve as a controller and/or media source to one or more "zone slaves" configured as part of the group or zone after the zone leader has been configured.

As used within this disclosure, a "sample" refers to a specific audio sample, for example, a sample of PCM (Pulse-coded Modulation) data, so each sample has single numeric value associated per channel (i.e. left and right for a stereo pair) with a fixed word length in bytes. A sample may have several parameters associated with it, for example, a PCM value corresponding to a coded amplitude, a sample index, and a channel identifier, among other parameters.

As used within this disclosure, the "sample index" or "sample number" is a sample parameter referring to a sequential number used to identify an audio sample. In general, a sample index n (where n may be an integer, for example, a 64 bit unsigned integer) is immediately preceded by a sample index n−1 and immediately followed by a sample index n+1. The sample index is incremented at a time according to a sample rate, for example a sample rate of 44.1 KHz (44,100 samples per second), or 48 KHz (48,000 samples per second). Accordingly, the sample index may be used as a measure of time, and may be thought of as and offset to a corresponding local playback buffer.

As used within this disclosure, the "current sample index," or the "current sample" refers to a sample index relative to the current time (the time of sampling). In most scenarios, the current sample index at time $t_2$ will generally be higher than the current sample index at time $t_1$, where time $t_2$ occurs after time $t_1$. However, in certain scenarios a media rendering device may reset the current sample index, for example to zero, or to another value.

As used within this disclosure, "audio data" generally refers to multiple samples, for example, multiple samples transmitted in frames (groups of n samples), where the sample number given to each frame corresponds to the index of the first sample of the frame in an arbitrarily long stream of samples, for example, being transmitted by the zone leader.

Reference will now be made in detail to embodiments of the present invention, examples of which are illustrated in the accompanying drawings. Wherever possible, the same reference numbers are used in the drawings and the description to refer to the same or like parts.

Figure 1:
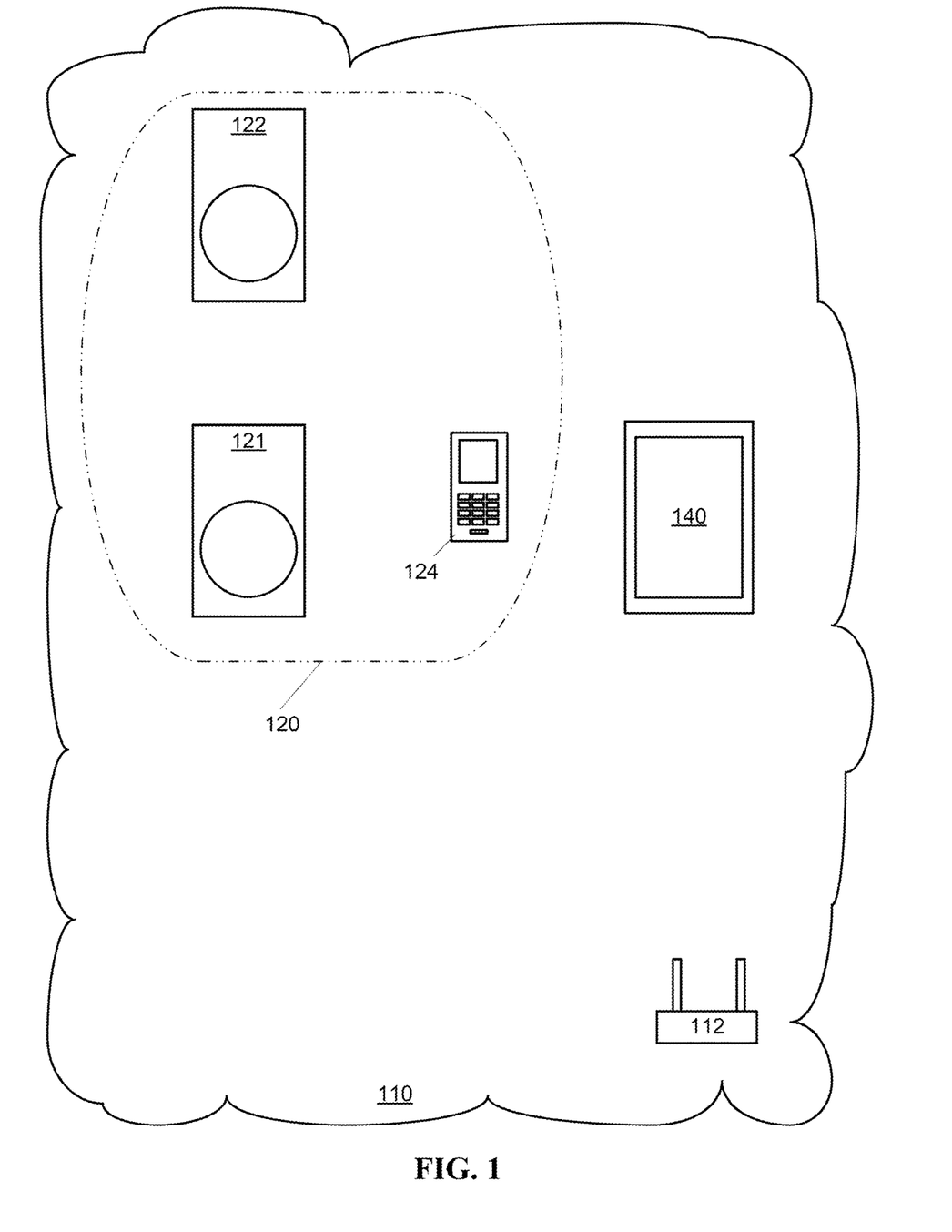
FIG. 1 is a schematic diagram showing an exemplary zone of media rendering devices in a network.

FIG. 1 is a schematic diagram showing a first exemplary embodiment of a media rendering device zone 120. As shown by FIG. 1, a data communications network 110, for example, a BlueTooth network or a home WiFi network including a WiFi router 112 or wireless access point, may be in communication with multiple devices, for example, a smart phone 124 and a tablet computer 140. One or more media rendering devices, for example, two media rendering devices 121, 122, also referred to as "players" herein for simplicity, are WiFi enabled, and may be configured to communicate with the network 110. While FIG. 1 shows only two media rendering devices 121, 122 in the media rendering device zone 120, in other embodiments there may be one, two, three, or more media rendering devices 121, 122 in the media rendering device zone 120.

The WiFi network may be, for example, an IEEE 802.11bgn network, among other possible networks. For example, the two players 121, 122 may be in communication with each other over a wired network, for example, via a local area network (LAN), or a private wired network.

A computing device, for example, one or more of the smart phone 124, the laptop, and the tablet computer 140, may be configured to run an application controlling one or more players 121, 122 in a group. In other embodiments, there may be more than two players in a group, for example, two stereo speakers and a subwoofer, a 5.1 and a 7.1 surround system.

The controller application on the smart phone 124 allows a user of the controller application to control and/or configure one or more audio devices, for example, players 121, 122. Players may be, for example, speakers containing audio amplifiers and a WiFi interface configured to render a received music stream. For example, the players 121, 122 may render a music stream received from the controller application on the smart phone 124 or another streaming source via the network 110. While the described embodiments herein generally include players as audio devices for exemplary purposes, players are not limited to being audio devices, and may also include video and/or audio-video rendering devices and other WiFi enabled audio and/or video devices, for example, video displays, pre-amplifiers and audio processors.

The players 121, 122 may both be a single type of device, or they may be different types of devices. Once the players 121, 122 are added to the network 110, the controller application on the smart phone 124 may allow a user of the smart phone 124 to control the players 121, 122. For example, the user of the smart phone 124 may use the controller application on the smart phone 124 to control operating parameters of the players 121, 122, such as volume, balance, and/or equalization. The controller application on the smart phone 224 may directly stream program material, such as an audio stream, to the players 121, 122, or may select program material to be streamed to the players 121, 122 from an internet source via the router 112 of the WiFi network 110. In general, the zone leader receives commands directly from the controller application, and the zone leader controls the action of the zone slaves. In general, the architecture of a zone leader and a zone slave may be identical, with the role of zone leader assigned to the first media rendering device activated in the network 110.

Figure 2:
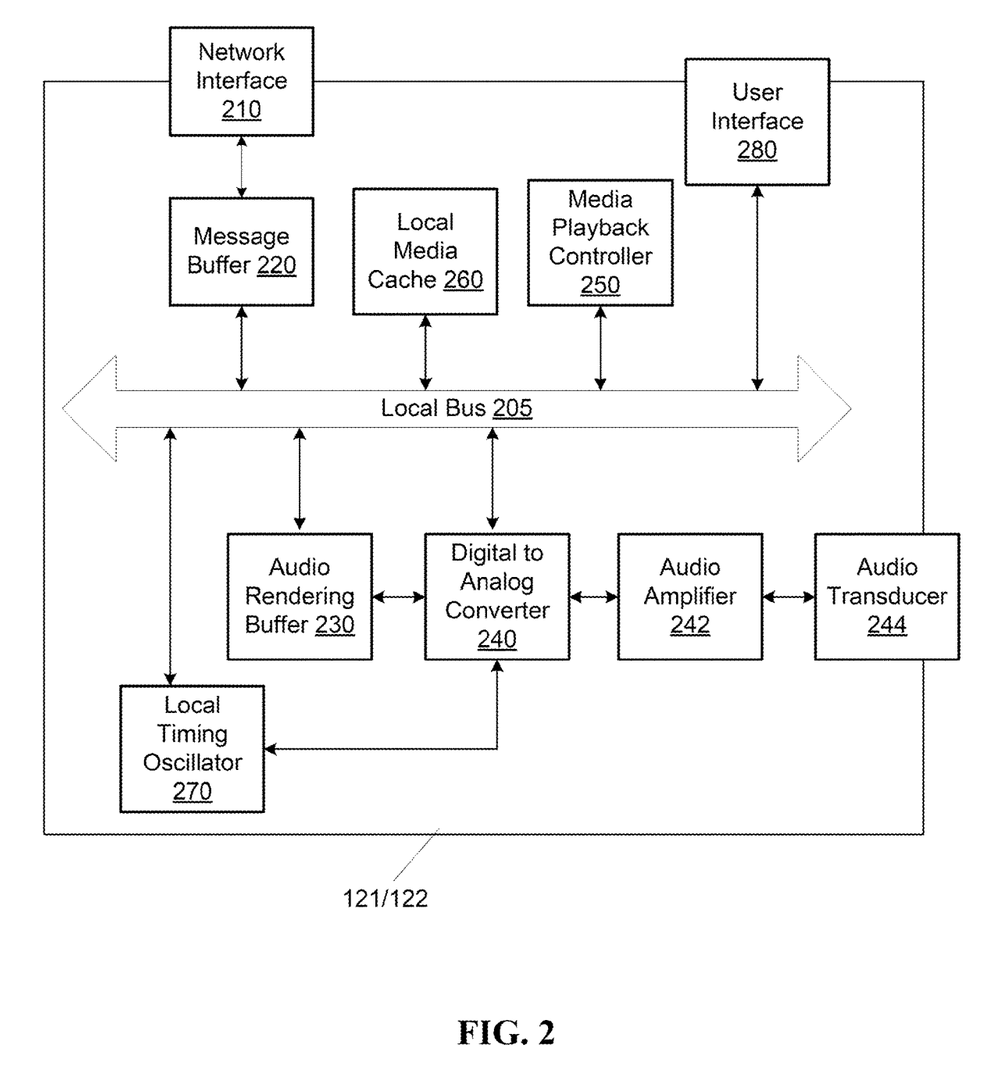
FIG. 2 is a schematic diagram detailing the media rendering devices of FIG. 1.

FIG. 2 is a schematic diagram detailing an exemplary media rendering device 121, 122. The media rendering device 121, 122 includes a media playback controller 250 including a processor configured to control playback of media, for example, media stored in a local media cache 260, and/or streaming media received via a network interface 210. The network interface 210 may be a wireless interface, for example, a WiFi interface in communication with a WLAN 110 (FIG. 1), a BlueTooth interface, or a wired network interface, for example connected to a wired network via an Ethernet connector. Data received via the network interface 210 may be packetized data, for example, TCP/IP data or another packet protocol that is received by the network interface 210 and stored in a message buffer 220. Persons having ordinary skill in the art will recognize that there may be separate receive and transmit message buffers, which are combined here for simplicity. The message buffer 220 may be accessed via other components in the media rendering device 121, 122 via a local bus 205. The data received via the network interface 210 may include commands, for example, configuration commands, and streamed media, for example, audio data.

The Media Playback Controller 250 may control playback of media rendering components including a local timing oscillator 270, an audio rendering buffer 230, a digital to audio converter (DAC) 240, an audio amplifier 242, and an audio transducer 244, among others. Generally, audio data is buffered in the audio rendering buffer 230. The audio data in the audio rendering buffer 230 may be sourced from the message buffer 220, for example, streamed audio, or from the local media cache 260. The DAC 240 converts the digital audio data into an analog audio signal, which may subsequently be amplified by an audio amplifier 242 and output by an audio transducer 244. Of course, there may be additional audio processing hardware present to further process the audio stream in the digital and/or analog realms. The DAC 240 may be clocked via the local timing oscillator 270. The operation of the local timing oscillator may be controlled via the media playback controller to ensure that the audio is rendered at the appropriate time, for example, to synchronize with another media rendering device 121, 122.

Under the first exemplary embodiment of a system for synchronizing a first media rendering device 121 in a network 110 with a second media rendering device 122 in the network 110, the first media rendering device 121 establishes itself as a group leader or a zone leader. For example, the first media rendering device 121 may boot up, connect to a LAN, for example, the wireless LAN 110 provided by the WiFi router 112 (or access point), and perform a discovery procedure to determine if there are other media rendering devices present in the network 110. If there are no other media rendering devices present, the first media rendering device 121 may establish itself as a zone leader of a zone 120.

Figure 3:
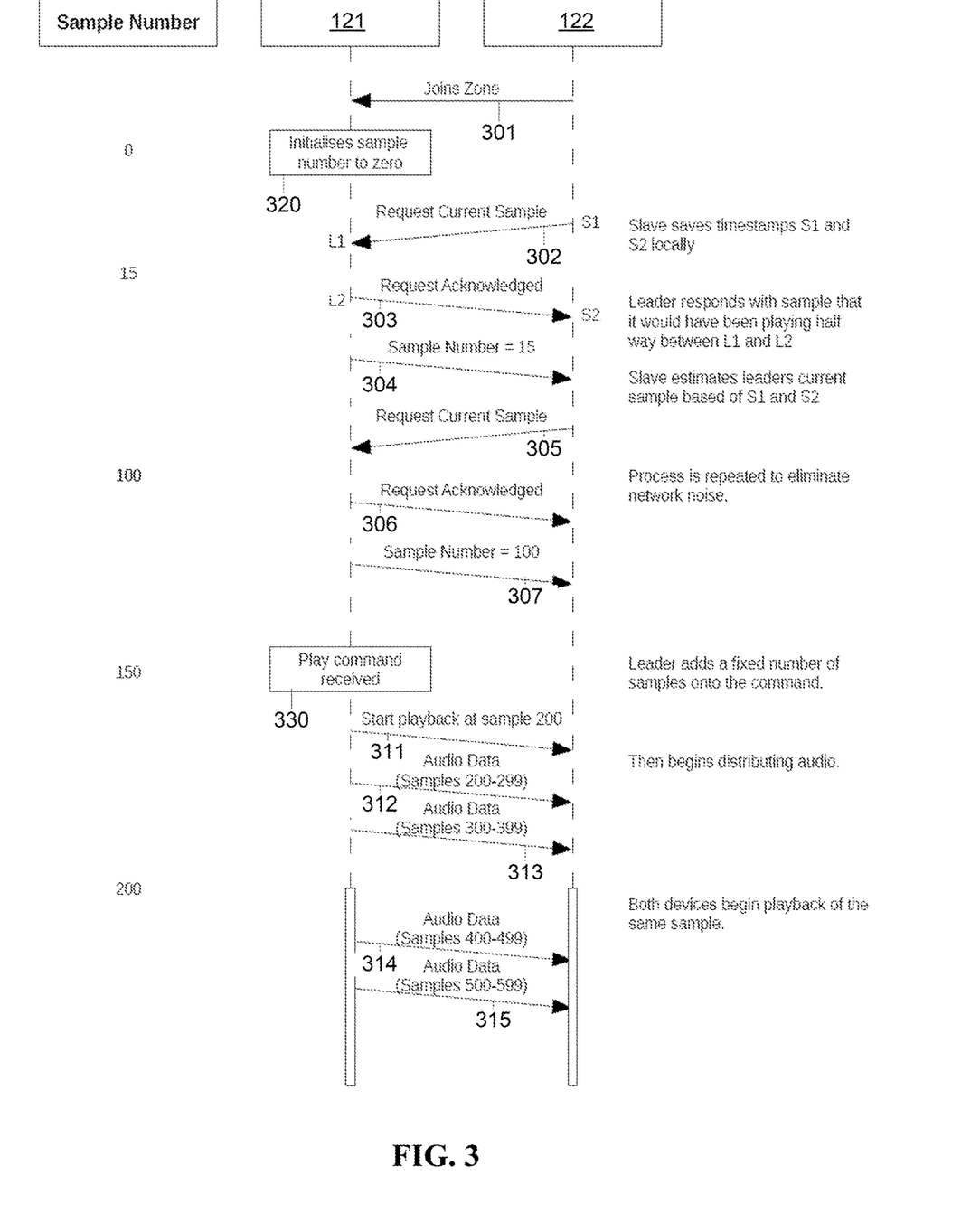
FIG. 3 is a timing diagram showing an exemplary first exchange of messages between two media rendering devices in the network of FIG. 1.
Figure 4:
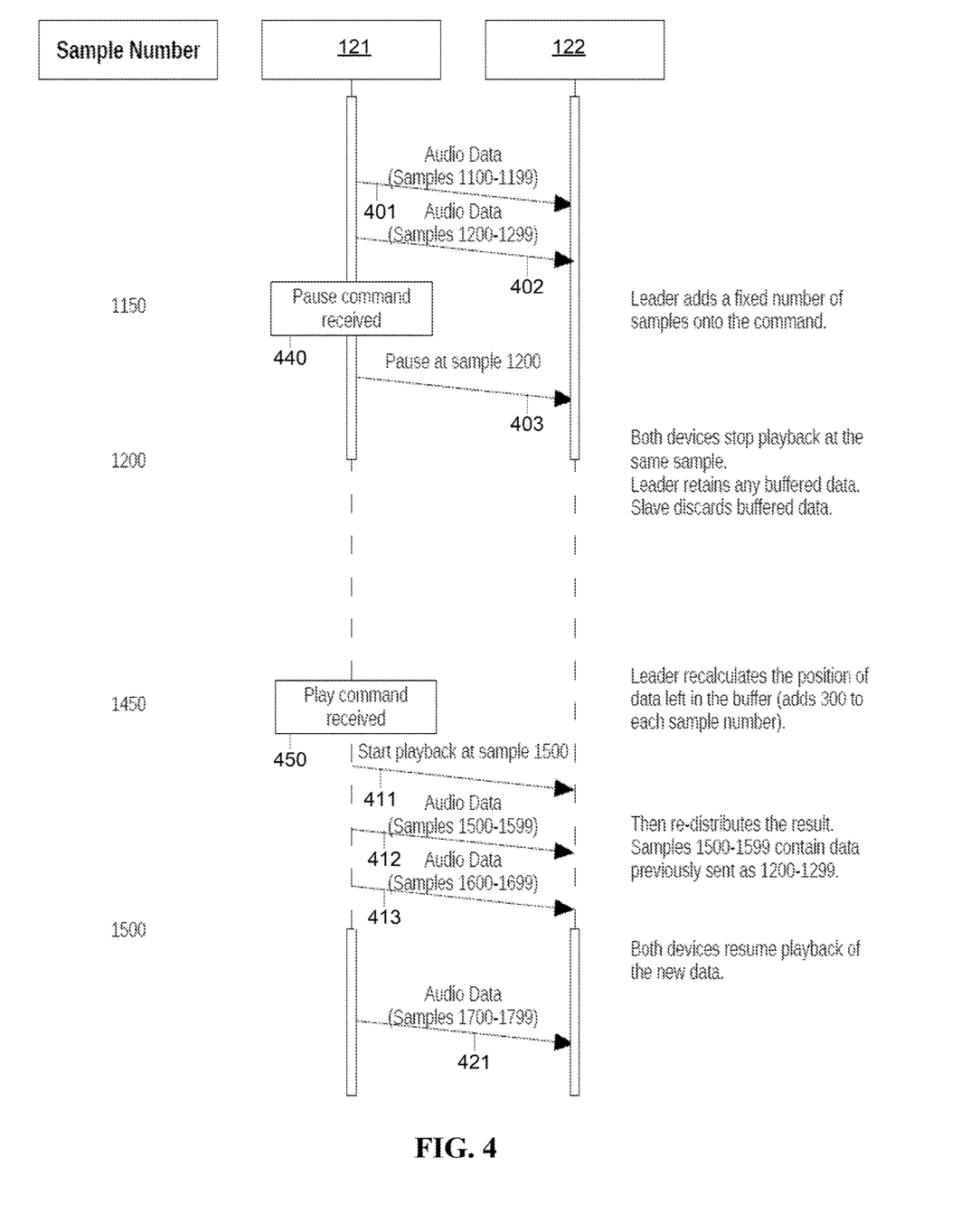
FIG. 4 is a timing diagram showing an exemplary second exchange of messages between two media rendering devices in the network of FIG. 1.

FIGS. 3 and 4 are timing diagrams showing an exemplary exchange of messages between two media rendering devices 121, 122. Consequently the FIGS. 3 and 4 illustrate an exemplary embodiment of a method for synchronizing a second media rendering device in a network with a first media rendering device in the network. While FIGS. 3 and 4 show the messages between a zone leader (first media rendering device 121) and a single zone slave (second media rendering device 122), similar message exchanges may be occurring between the zone leader and a plurality of zone slaves.

As shown by a first message 301 indicates the second media rendering device 122 has joint the zone 120 (FIG. 1) with the first media rendering device 121. The first media rendering device 121 may initialize a sample index counter and begin rendering media within its zone of one rendering device. Thereafter, the second media rendering device 122 may boot up and connect to the wireless LAN 110 and the first media rendering device 121 and the second media rendering device 122 may discover one another on the network 110, and the second media rendering device 122 negotiates with the first media rendering device 121 to join the zone 120 as a zone slave. Once the second media rendering device 122 joins the zone 120, the first media rendering device may initialize or re-initialize the sample counter to zero, as shown by block 320.

At a first time S1, the second media rendering device 122 sends a request 302 for a current audio sample index from the first media rendering device 121. The first media rendering device 121 receives the request 302 at a time L1, and sends an acknowledgement message 303 to the second media rendering device 122 at a time L2. The second media rendering device 122 receives the acknowledgement message 303 at a time S2. The acknowledgement message 303 includes a first current audio sample index equal to a value for an internal sample index for the first media rendering device 121.

The second media rendering device 122 calculates a transmission latency of S2-S1 and estimates an updated first media rendering device internal sample index value based on the first current sample index value and the transmission latency. Here, the second media rendering device 122 may estimate the current sample of the first media rendering device based on S1 and S2, for example by assuming equal transit time for the request current sample message 302 and the request acknowledgement message 303.

L1 denotes a first point in time when the request current sample message 302 was received from the network and L2 denotes a first point in time when the request acknowledgement message 303 is transmitted via the network from the perspective of the zone leader, in this case the first media rendering device 121. The determination of L1 and/or L2 may be based on the limitations of the specific media rendering device 121, for example, the definition of when a message is transmitted or received may be determined differently for Wi-Fi compared to Ethernet.

Under the first embodiment L1 and L2 are both timestamps from the local timing oscillator 270 of the first media rendering device 121, based upon best estimates of when the respective request message was actually received and the time when the request acknowledgement is to be transmitted. The timestamps L1 and L2 may be averaged to determine a halfway point that is converted from a time value into the corresponding sample number included in the request acknowledgement message 303.

The second media rendering device 122 may repeatedly request the current sample, as shown by messages 305, 306, 307, to converge on an estimated sample number of the first media rendering device 121, for example, to overcome various system artifacts, for example, network noise, network latency, et cetera. In alternative embodiments, for example, where media rendering devices 121, 122 use different types of network connections (for example, one with a wire Ethernet connection and another connected via WiFi), a fixed weighting may be applied to compensate for one direction of transmission being faster than another. The second media rendering device 122 may adjust its internal current sample according to the estimated sample number of the first media rendering device 121. Alternatively, the second media rendering device 122 may maintain an independent internal sample index and keep track of an offset value from the current sample index of the first media rendering device 121.

Under the first embodiment, audio data is generally transmitted in frames containing groups of multiple samples, where the sample number given to each frame corresponds to the index of the first sample of the frame in an arbitrarily long stream of samples, for example, being transmitted by the zone leader. Under the first embodiment, which may use PCM encoding of audio data, if compressed audio is being sent the compression/decompression preferably does not change the number of samples, the sample rate, or the sample format. Therefore, the sample number given to each frame remains constant. The number of samples present in each frame is largely determined by the media source, so may vary between frames.

Under the first embodiment, the sample rate for audio samples may be constant across all media rendering devices 121, 122 in a media rendering system, for example, 44.1 KHz or 48 KHz. However, in alternative embodiments the sample rate may vary according to the media being transmitted. For example, in alternative embodiments the zone leader may change sample rates on the fly, provided the zone leader communicates the updated sample rate to each zone slave.

The first media rendering device 121 may receive a media rendering start playback command, as shown by block 330. The media rendering start playback command may originate for example, from a user interface 280 (FIG. 2), or from a command received from an external controller device 124 (FIG. 1) or another media rendering device 122 via the network interface 210 (FIG. 2). The first media rendering device 121 determines a playback start sample index indicating a sample when media playback is to begin, for example by adding a predetermined number to the current audio sample index. The predetermined number may correspond to a time, for example but not limited to a range of 50 ms to 1000 ms. The predetermined number may also include an additional offset, for example, corresponding to 0-50 ms to compensate for the amount of time it takes for audio data to be processed in hardware on the first media rendering device 121 and/or the second media rendering device 122. The additional offset may take into consideration the specific hardware (product type) of the first media rendering device 121 and/or the second media rendering device 122 as well as the sample rate of the input audio data (which may not be 44.1 KHz).

The first media rendering device 121 transmits the playback start sample index to the second media rendering device 122 in message 311. The first media rendering device 121 begins transmitting audio data to the second media rendering device in message 312, and continues transmitting audio data in messages 313, 314, 315. The audio data is transmitted in advance of a playback time corresponding to the playback start sample index so that there is time for the second media rendering device 122 to receive and buffer the audio data in its audio rendering buffer 230 (FIG. 2) before the playback time.

The first media rendering device 121 and the second media rendering device 122 begin rendering the audio data starting with a sample corresponding to the start sample index at a time corresponding to the playback start sample index. Each of the first media rendering device 121 and the second media rendering device 122 may correlate the time corresponding to the playback start sample index according to their respective local timing oscillators 270 (FIG. 2), such that the audio at the output of their respective DACs 240 (FIG. 2) is synchronized. The second media rendering device 122 may periodically repeat the process of checking the current sample of the first media rendering device 121 to ensure that the local timing oscillator 270 (FIG. 2) of the second media rendering device 122 has not drifted ahead or behind with respect to the local timing oscillator 270 (FIG. 2) of the first media rendering device 121.

The local timing oscillator 270 (FIG. 2) may be, for example, a voltage or numerically controlled oscillator, such that the exact frequency of the local timing oscillator 270 for each media rendering device 121, 122 may be changed during operation. If the second media rendering device 122 (slave) drifts ahead or behind the first media rendering device 121 (leader), the second media rendering device 122 (slave) may adjust the speed of its local timing oscillator 270 (FIG. 2) to compensate for any detected drift. Preferably, the second media rendering device 122 resynchronizes with the first media rendering device 121 often enough that the adjustments to the local timing oscillator 270 (FIG. 2) are generally less than 1%. In this way the first media rendering device 121 and the second media rendering device 122 maintain synchronization of media playback without using a centralized clock, and without transmitting a clock signal between them. As a result, each slave (second media rendering devices) 122 may be thought of as operating from its own flywheel clock (e.g., its local timing oscillator 270 (FIG. 2), where the flywheel clock is adjusted periodically to keep synchronized with the local timing oscillator 270 (FIG. 2) of the zone leader (first media rendering device) 121.

FIG. 4 is a timing diagram showing an exemplary second message exchange between two media rendering devices 121, 122, continuing after FIG. 3. The first media rendering device 121 transmits audio data to the second media rendering device 122 in messages 401, 402. As noted before, the audio data in the messages 401, 402 includes the sample index for each sample of audio data.

As shown by block 440, the first media rendering device 121 receives a media rendering pause playback command. The media rendering pause playback command may originate for example, from a user interface 280 (FIG. 2), or from a command received from an external controller device 124 (FIG. 1) or another media rendering device 122 via the network interface 210 (FIG. 2). The first media rendering device 121 determines a playback pause sample index indicating a sample (time) when media playback is to pause, for example by adding a predetermined number (of samples) to the current audio sample index. The predetermined number may correspond to a time, for example but not limited to a range of 10 ms to 200 ms.

The first media rendering device 121 transmits the playback pause sample index to the second media rendering device in message 403. The first media rendering device 121 and the second media rendering device 122 pause rendering of the audio data at a sample of the audio data corresponding to the pause sample index at a time corresponding to the playback pause sample index. The second media rendering device 122 may then purge previously received audio data from its audio rendering buffer 230 (FIG. 2).

As shown by FIG. 4 at block 450, the first media rendering device 121 may receive a subsequent media rendering start playback command. The first media rendering device 121 determines a playback start sample index indicating a sample when media playback is to resume, as described previously. The first media rendering device 121 transmits the playback start sample index to the second media rendering device 122 in message 411. The first media rendering device 121 resumes transmitting audio data to the second media rendering device in message 412, 413. Some of the audio data may be duplicative of audio data that was purged by the second media rendering device 122 after receiving the pause command. The audio data is transmitted in advance of a playback time corresponding to the playback start sample index so there is time for the second media rendering device 122 to receive and buffer the audio data in the audio rendering buffer 230 (FIG. 2) before the playback time. The first media rendering device 121 and the second media rendering device 122 resume rendering the audio data starting with a sample corresponding to the start sample index at a time corresponding to the playback start sample index.

The timing diagrams of FIGS. 3 and 4 illustrate an exemplary exchange of messages in response to play and pause commands. The mechanism for synchronizing between the zone leader and zone slaves for other types of commands, for example, change playback volume, tone, or other commands, is generally similar, where the zone leader sends a message to one or more zone slaves indicating an action and a sample index indicating when the slave is to perform the indicated action.

Figure 5:
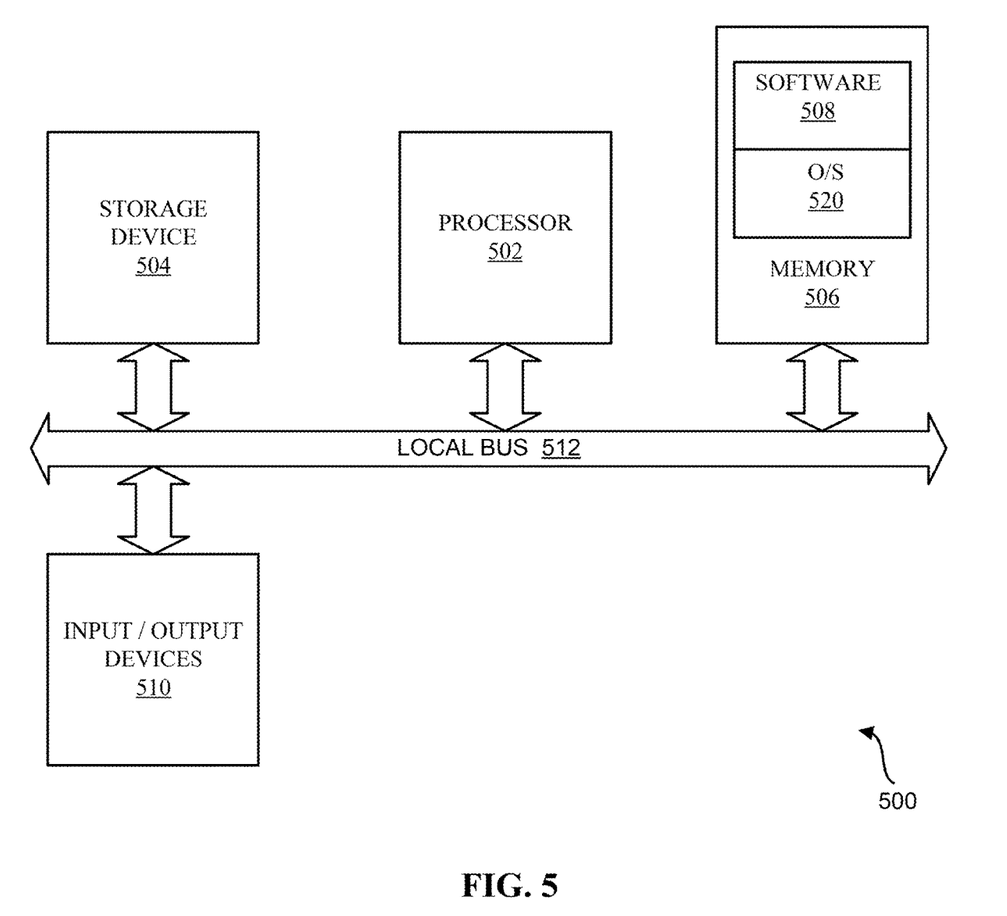
FIG. 5 is a schematic diagram illustrating an example of a system for executing functionality of the present invention.

The present system for executing the functionality described in detail above may include one or more computers, an example of which is shown in the schematic diagram of FIG. 5. The system 500 contains a processor 502, a storage device 504, a memory 506 having software 508 stored therein that defines the abovementioned functionality, input and output (I/O) devices 510 (or peripherals), and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a macroprocessor, or generally any device for executing software instructions.

The memory 506 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a keyboard, mouse, scanner, microphone, etc. Furthermore, the I/O devices 510 may also include output devices, for example but not limited to, a printer, display, etc. Finally, the I/O devices 510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above.

When the functionality of the system 500 is in operation, the processor 502 is configured to execute the software 508 stored within the memory 506, to communicate data to and from the memory 506, and to generally control operations of the system 500 pursuant to the software 508. The operating system 520 is read by the processor 502, perhaps buffered within the processor 502, and then executed.

When the system 500 is implemented in software 508, it should be noted that instructions for implementing the system 500 can be stored on any computer-readable medium for use by or in connection with any computer-related device, system, or method. Such a computer-readable medium may, in some embodiments, correspond to either or both the memory 506 or the storage device 504. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 502 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the system 500 is implemented in hardware, the system 500 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In summary, it will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for synchronizing a second media rendering device in a network with a first media rendering device in the network comprising the steps of:
    at a first time s1, sending by the second media rendering device a request for a current audio sample index from the first media rendering device;
    at a second time s2 receiving by the second media rendering device a first current audio sample index equal to a value for a first media rendering device internal sample index;
    determining by the second media rendering device a transmission latency;
    estimating by the second media rendering device an updated first media rendering device internal sample index value based on the transmission latency and a sampling rate of the audio stream; and
    setting by the second media rendering device a second media rendering device internal sample index to the updated first media rendering device internal sample index value to synchronize rendering of the audio stream with the first media rendering device.

2. The method of claim 1, wherein the transmission latency is determined at least in part by the difference between s1 and s2.

3. The method of claim 1, further comprising the steps of:
    receiving, by the first media rendering device, a media rendering start playback command;
    determining, by the first media rendering device, a playback start sample index indicating a sample when playback is to begin;
    transmitting the playback start sample index by the first media rendering device to the second media rendering device;
    receiving the playback start sample index by the second media rendering device from the first media rendering device;
    transmitting audio data of the audio stream by the first media rendering device to the second media rendering device;
    receiving the audio data by the second media rendering device audio data from the first media rendering device; and
    beginning rendering the audio data by the first media rendering device and the second media rendering device starting with a sample corresponding to the start sample index at a time corresponding to the playback start sample index.

4. The method of claim 3, wherein determining the playback start sample index comprises adding a predetermined number to the current audio sample index.

5. The method of claim 1, further comprising the steps of:
    receiving, by the first media rendering device, a media rendering pause playback command;
    determining, by the first media rendering device, a playback pause sample index indicating a sample when playback is to pause;
    transmitting the playback pause sample index by the first media rendering device to the second media rendering device;
    receiving the playback pause sample index by the by the second media rendering device from the first media rendering device;
    pausing rendering the audio data by the first media rendering device and the second media rendering device starting with a sample corresponding to the pause sample index at a time corresponding to the playback pause sample index.

6. The method of claim 1, wherein the first media rendering device is configured as a zone leader, and the second media rendering device is configured as a zone slave.

7. The method of claim 1, further comprising the step of adjusting a rate of a local timing oscillator of the second media rendering device based upon the updated first media rendering device internal sample index.

8. The method of claim 1 wherein the first media rendering device receives the request for the current audio sample index from the second media rendering device at a time L1 and the first media rendering device sends the message including the first current audio sample index at a time L2, and the value for the first media rendering device internal sample index is determined at least in part by a difference between L1 and L2.

9. The method of claim 1, further comprising the steps of:
    receiving, by the first media rendering device, a media rendering change playback command;
    determining, by the first media rendering device, a change playback sample index indicating a sample when at least one parameter regarding media playback is to be changed;

transmitting the change playback sample index by the first media rendering device to the second media rendering device;
receiving the change playback sample index by the by rendering device from the first media rendering device;
transmitting audio data by the first media rendering device to the second media rendering device;
receiving audio data by the second media rendering device audio data from the first media rendering device;
changing rendering of the audio data by the first media rendering device and the second media rendering device starting with a sample corresponding to the change playback sample index at a time corresponding to the change playback sample index.

10. A method for synchronizing a second media rendering device in a network with a first media rendering device in the network comprising the steps of:
at a first time s1 sending by the second media rendering device a request for a current audio sample index from the first media rendering device;
at a second time s2 receiving by the second media rendering device a first current audio sample index value from the first media rendering device;
calculating by the second media rendering device a transmission latency;
estimating by the second media rendering device an updated first media rendering device internal sample index value, based on the transmission latency and a sampling rate of the audio stream; and
setting by the second media rendering device a second media rendering device internal sample index based upon the updated first media rendering device internal sample index.

11. The method of claim 10, further comprising the steps of:
receiving a playback command sample index from the first media rendering device;
receiving audio data by the second media rendering device audio data from the first media rendering device;
executing a command regarding rendering the audio data by the second media rendering device starting with a sample corresponding to the playback command sample index at a time corresponding to the playback command sample index.

12. The method of claim 10, further comprising the step of adjusting a rate of a local timing oscillator of the second media rendering device based upon the updated first media rendering device internal sample index.

13. A media rendering device comprising:
a network interface configured to communicate with a network;
an audio rendering buffer configured to store audio samples;
a local timing oscillator;
a digital-to-analog converter configured to receive multiple audio samples from the audio rendering buffer and to receive a clock signal from the local timing oscillator; and
a processor and a memory configured to store non-transient instructions that, when executed by the processor, cause the processor to:
at a first time s1, send a request for a current audio sample index of an audio stream from a leader media rendering device;
at a second time s2, receive a first current sample index value of the audio stream from the leader media rendering device;
calculate a network transmission latency relative to the leader media rendering device;
estimate an updated leader media rendering device internal sample index value based on the network transmission latency and a sampling rate of the audio stream; and
set a media rendering device internal sample index to the updated leader media rendering device internal sample index value.

14. A media rendering system, comprising:
a first media rendering device, comprising:
a first network interface configured to communicate with a network;
a first audio rendering buffer configured to store audio samples;
a first local timing oscillator; and
a first digital-to-analog converter configured to receive multiple audio samples from the first audio rendering buffer and to receive a clock signal from the first local timing oscillator; and
a second media rendering device configured to communicate via the network with and the first media rendering device, the second media rendering device comprising:
a second network interface configured to communicate with the network;
a second audio rendering buffer configured to store audio samples;
a second local timing oscillator;
a second digital-to-analog converter configured to receive multiple audio samples from the second audio rendering buffer and to receive a clock signal from the second local timing oscillator; and
a processor and a memory configured to store non-transient instructions that, when executed by the processor, cause the processor to:
at a first time s1, send a request for a current audio sample index of an audio stream from the first media rendering device;
at a second time s2, receive a first current sample index value from the first media rendering device;
calculate a network transmission latency as a difference between s1 and s2;
estimate an updated first media rendering device internal sample index value based on the network transmission latency and a sampling rate of the audio stream; and
set a second media rendering device internal sample index to the updated first media rendering device internal sample index value.

15. The system of claim 14, wherein the first media rendering device is further configured to:
receive a media rendering start playback command;
determine a playback start sample index indicating a sample when playback is to begin;
transmit the playback start sample index to the second media rendering device; and
transmit audio data of the audio stream by the first media rendering device to the second media rendering device.

16. The system of claim 15, wherein the first and second media rendering devices are configured to begin rendering the audio data starting with a sample corresponding to the playback start sample index at a time corresponding to the playback start sample index.

17. The system of claim 15, wherein the first media rendering device is configured to determine the playback start sample index by adding a predetermined number to the current audio sample index.

* * * * *